United States Patent [19]
Hosler et al.

[11] 3,748,231
[45] July 24, 1973

[54] MICROBIOLOGICAL OXIDATION OF ALKYL-SUBSTITUTED CYCLIC COMPOUNDS

[75] Inventors: Peter Hosler, Wallingford, Pa.;
Richard L. Raymond, Wilmington, Del.

[73] Assignee: Sun Research and Development Co., Philadelphia, Pa.

[22] Filed: Jan. 27, 1972

[21] Appl. No.: 221,446

Related U.S. Application Data
[63] Continuation-in-part of Ser. No. 888,964, Dec. 29, 1969, abandoned.

[52] U.S. Cl. ............................... 195/28 R, 195/51 R
[51] Int. Cl............................................. C12d 13/00
[58] Field of Search................. 195/28 R, 51 R, 3 H

[56] References Cited
UNITED STATES PATENTS

| | | | |
|---|---|---|---|
| 3,326,771 | 6/1967 | Leavitt | 195/28 R |
| 3,326,772 | 6/1967 | Leavitt | 195/28 R |
| 3,642,577 | 2/1972 | Gorring | 195/28 R |

*Primary Examiner*—Alvin E. Tanenholtz
*Attorney*—George L. Church et al.

[57] ABSTRACT

The $\beta$-carbon atom of $C_2$–$C_3$ alkyl side-chains of mononuclear aromatic or cycloaliphatic compounds may be oxidized by certain organisms of the genus Nocardia to form the corresponding hydroxy and/or keto derivatives thereof.

7 Claims, No Drawings

MICROBIOLOGICAL OXIDATION OF ALKYL-SUBSTITUTED CYCLIC COMPOUNDS

CROSS REFERENCE TO RELATED APPLICATION

This application is a continuation in part of application Ser. No. 888,964, filed Dec. 29, 1969 in the name of Peter Hosler and Richard L. Raymond and now abandoned.

BACKGROUND OF THE INVENTION

This invention relates to the microbiological oxidation by selected species of the genus Nocardia of the β-carbon atom of the alkyl side chains of certain di- and tri-alkyl substituted cyclic compounds, such as di-alkylbenzenes or tri-alkyl-substituted cycloaliphatics, wherein said side chains contain from two to three carbon atoms, to form the corresponding hydroxy and/or keto derivatives thereof.

There are various reports of microbial action on alkylbenzenes in the literature. Davis and Raymond, U.S. Pat. No. 3,057,784, describe the oxidation of the alkyl groups to give the corresponding phenyl-substituted short-chain acid, when fermented with a microorganism such as Nocardia, grown on an energy-providing substrate such as n-alkanes or carbohydrate. In the case of the oxidation of ethylbenzene, the principal reaction product is indicated to be phenylacetic acid, i.e., the product of oxidation of an α-carbon atom.

U.S. Pat. Nos. 3,326,771 and 3,326,772, issued to R. I. Leavitt describe the oxidation of alkyl-substituted aromatics such as ethylbenzene, n-propylbenzene, cumene and the like, employing the enzymatic activity of organisms of the genera Pseudomonas and Nocardia. In particular, Example 2 of U.S. Pat. No. 3,326,771 illustrates the action of the species Nocardia salmonicolor, strain 107–332 on certain hydrocarbons, the products of which reaction are not defined. However, as demonstrated in the article "Oxidation of Alkyl-substituted Cyclic Hydrocarbons by a Nocardia During Growth on n-Alkanes" by Leavitt's co-workers, Davis and Raymond, in *Applied Microbiology*, Vol. 9, No. 5, P.383 et seq (1961), the action of said disclosed species Nocardia salmonicolor, strain 107–332 on ethylbenzene results in the oxidation of the α-carbon atom of the ethyl side-chain to form phenylacetic acid, as reported in Davis' above mentioned U.S. Pat. No. 3,057,784. Thus, in both of the U.S. Pat. Nos. 3,326,771 and 3,326,772 as substantiated in the Davis and Raymond article, there are obtained as products only compounds resulting from the α-carbon oxidation of alkyl-substituted cyclic hydrocarbons.

With a different strain of Nocardia an attack on the aromatic nucleus of an alkylbenzene can be expected. In U.S. Pat. No. 3,383,289, Raymond et al. teach that a methylbenzene can be microbially oxidized to a catechol-type derivative, with vicinal hydroxyl groups, or the benzenoid ring may be opened to give the corresponding muconic acid. In an example of oxidizing p-xylene with one species of Nocardia grown on n-hexadecane, dimethylmuconic acid is reported to be the principal oxidation products.

Finally, Webley et al (Nature 178 1467-68, 1956) reported in a paper entitled "Evidence for β-oxidation in the Metabolism of Saturated Aliphatic Hydrocarbons by Soil Species of Nocardia," that they found no activity of several Nocardia species on ethyl, propyl or butyl benzene, although they reported omega-oxidation on longer chain alkyl benzenes.

Thus, it will be evident from the foregoing that the only type of enzymatic oxidation of alkyl side chains by species of Nocardia known to be reported to date has been predominantly oxidation of the α-carbon atom, with no comparable β-oxidation taught anywhere. In the case of Nocardia salmonicolor, strain 107–332 reported by Davis et al., the production of phenylacetic acid from ethylbenzene is clearly the rule. This is to be contrasted with the action of Nocardia salmonicolor ATCC 19,149 (described herein below) as diethylbenzene to produce compounds wherein oxidation takes place uniquely on the β-carbon atom.

SUMMARY OF THE INVENTION

In accordance with the present invention, it has now been found that the β-carbon atom of ethyl or n-propyl side chains of mononuclear aromatic or cycloaliphatic compounds, wherein the number of alkyl side chains attached to the cyclic substrates is either two or three, may be oxidized by the microbial action of selected species of Nocardia to form the corresponding hydroxy and/or keto derivatives thereof.

DESCRIPTION OF THE INVENTION

As stated hereinabove, the starting materials employed as substrates in the process of this invention are di- and tri-alkyl substituted cyclic compounds wherein the alkyl groups contain two or three carbon atoms, and wherein the cyclic compounds are either mononuclear aromatic or cycloaliphatic rings. Thus, the starting materials include such compounds as diethylbenzene, di-n-propylbenzene, triethylbenzene, tri-n-propylbenzene, diethylcyclohexane, tri-n-propylcycloheptane and like compounds or mixtures thereof, wherein the cycloaliphatic ring may contain from five to eight carbon atoms.

When these aforesaid compounds are oxidized by the microbial action of the Nocardia species described below, there are obtained the corresponding β-hydroxy and/or keto compounds or mixtures thereof, as for example diacetylbenzene, triacetylbenzene, 1,4-diacetonylbenzene, (1-hydroxyethyl)acetophenone, (2-hydroxy-1-propyl)acetonylbenzene, diacetylcyclohexane, 1,4,6-triacetonylcycloheptane, and the like.

The types of Nocardia which are suitable for the practice of the present invention are defined as those which will oxidize the β-carbon atom of the 2–3 carbon side-chain of the starting materials described above (hereinafter referred to as "β-carbon oxidizing" strains). These β-carbon oxidizing strains have been found among various species occuring in nature (including species classified in accordance with Bergey's Manual as Nocardia corallina, Nocardia salmonicolor, and Nocardia minima, of which Nocardia corallina is generally preferred), and include the following specific organisms:

1. A wild-type strain obtained from soil in Alabama, having characteristics approximating those set forth for Nocardia corallina in Bergey's Manual and hence classified as such species. A culture of this strain has been deposited with the American Type Culture Collection in Washington, D. C., under the number ATCC 19,070. Colonies of this microorganism have an orange color.

2. A reddish colored mutant obtained by ultraviolet irradiation of ATCC No. 19,070. The mutant has also been deposited with the American Type Culture Collection and has been designated as *Nocardia nov.sp.* ATCC No. 19,071.

3. A strain isolated from Pennsylvania soil and likewise classified as *Nocardia corallina*. This microorganism is orange colored like the first-mentioned wild-type specimen but shows distinct differences in enzymatic oxidative characteristics. A culture deposit of this strain has been designated as ATCC No. 19,148.

4. A soil isolate having characteristics approximating those given in Bergey's Manual as *Nocardia salmonicolor* and hence so classified. A culture deposit has been identified as ATCC No. 19,149.

5. Another soil isolate classified as per Bergey's Manual as *Nocardia minima* and designated at ATCC No. 19,150.

The nutrient medium for the culture of Nocardia strains for use in this invention should contain sources of available nitrogen, phosphorous, sulfur and magnesium as well as various trace elements as conventionally employed. Mineral salts customarily used for supplying such elements in biological fermentations can be employed. Examples of suitable nitrogen sources are ammonium salts such as $(NH_4)_2SO_4$ or $NH_4Cl$, nitrate salts such as $NH_4NO_3$ or $NaNO_3$, urea, soybean meal and other organic nitrogen sources. The following illustrates a suitable mineral salt composition for the present purposes:

| | Conc.,g./l. of $H_2O$ |
|---|---|
| $MgSO_4 \cdot 7H_2O$ | 0.2 |
| $Na_2CO_3$ | 0.1 |
| $CaCl_2 \cdot 2H_2O$ | 0.01 |
| $MnSO_4 \cdot H_2O$ | 0.02 |
| $FeSO_4 \cdot 7H_2O$ | 0.005 |
| $Na_2KPO_4$ | 3.0 |
| $KH_2PO_4$ | 2.0 |
| Urea | 2.0 |

This mineral salt composition normally has a pH of about 7.1. When it is desired to carry out the fermentation at a pH below 7, the amount of $KH_2PO_4$ relative to $Na_2HPO_4$ can be increased to reduce the pH to a lower level.

The process of the invention is generally carried out at a temperature within the range of 20° to 40°C and preferably at 28° to 32°C under aerobic conditions with agitation. The nutrient medium should have a pH in the range of 4 to 9 and more desirably 6 to 8.

In preparing a Nocardia culture for use in the present process, a sample of a suitable Nocardia strain from a slant is transferred to a shake flask containing mineral salts solution and a suitable carbon source for growth. The carbon source can be a suitable hydrocarbon such as hexadecane, saturates derived from kerosene or toluene, or a carbohydrate such as dextrose, or hydrolyzed protein. Preferably the carbon source material is added periodically in small amounts during incubation. In some cases it may be desirable also to have growth-stimulating materials such as peptone, beef extract or yeast extract present, although this is often not necessary. In the case of the mutant ATCC No. 19,701 referred to above, such material should be supplied since this organism, unlike the parent wild-type ATCC No. 19,070, requires a source of the vitamin, p-aminobenzoic acid, at least for initial growth and such material can provide this growth factor. The mixture is incubated at 30°C and hexadecane (or other carbon source material) is added from time to time as the cell growth takes place, preferably being added in increasing amounts. After an incubation period typically of 24 hours, the cells can then be used for purpose of the invention.

The fermentation can be carried out by subjecting the substrate in the presence of the nutrient medium to action of the Nocardia organism under growth conditions. When growth conditions are employed, a sample of the inoculum prepared as above described is added to a mineral salts medium in a fermentor and the cells are first grown at 30°C on hexadecane, for example, for about 24 hours without any addition of the substrate. After good growth has been obtained, periodic additions of the substrate, along with additional amounts of hexadecane to sustain growth, are made and the fermentation is continued until maximum yield of the desired product is obtained. Alternatively, a continuous feed of dextrose may be substituted for hexadecane. A total fermentation time of 96 hours usually is typical for obtaining maximum product yield. The rate at which the substrate is added to the fermentation medium should be sufficient to maintain the concentration at 10 to 100 p.p.m. of substrate in the broth.

After the fermentation has been completed, the cells are separated from the broth by centrifugation and the clear broth can then be processed in any suitable manner for recovery of the products.

A preferred microorganism for practicing the invention is *Nocardia corallina* ATCC No. 19,070 mentioned above. Cultural and physiological characteristics which identify and distinguish this microorganism are as follows.

Staining characteristics:
  Age — 24 to 168 hours
  Gram — $gm^+$, granules
Cell morphology:
  Form — rod with branching in young culture (0–48 hrs.)
  Motility — non-motile
  Size —
    24 hours — 1–1.5 by 3–20 microns, branching
    48 hours — 0.5–1.5 by 1–5 microns, some branching
    72 hours — 1 by 1–2 microns
Agar colonies:
  Age — 72 hours
  Form — Circular
  Elevation — convex
  Surface — butyrous
  Margin — entire
  Chromogenesis — orange
Agar stroke:
  Age — 72 hours
  Form — filamentous
  Consistency — butyrous
  Chromogenesis — light orange
Nutrient broth:
  Surface growth — flocculent
  Subsurface growth — none
  Amount — fair growth
  Sediment — granular, orange
Gelatin stab:
  Liquefaction — none
  Growth — none
Potato dextrose agar:
  Age — 72 hours
  Growth — none
Potato slant:

Age — 72 hours
Chromogenesis — deep orange
Consistency — butyrous
Glucose agar:
  Age — 72 hours
  Chromogenesis — light orange, cream
  Consistency — butyrous
Action on sugars:
  Maltose — no acid, no gas, very good growth
  Sorbitol — no acid, no gas, very good growth
  Dextrose — no acid, no gas, growth
  Mannitol — no acid, no gas, slight growth
  Lactose — slight alkaline, no gas, good growth
  L-arabinose — slight alkaline, no gas, growth
  Saccharose — no acid, no gas, growth
  Levulose — no acid, no gas, good growth
  Inositol — slight alkaline, no gas, good growth
Action on milk: Reaction — none; ring growth, orange
Other characteristics:
  Nitrites from nitrates
  Hydrogen sulfide not produced
  Indole not produced
  No phenol or naphthalene utilized
  Starch not hydrolyzed
  Utilizes sodium and ammonium salts as nitrogen source The following examples specifically illustrate embodiments of the invention.

EXAMPLE 1

To a 40-liter fermentor is added a mineral salt solution of the composition listed above. The mixture is inoculated with *Nocardia corallina* ATCC No. 19,070 and stirred vigorously at about 30°C while being aerated. First the organism is allowed to grow in the presence of dextrose until about 2 to 3 grams of cells per liter has accumulated. This requires about 9 hours. Thereafter the fermentation is continued at 30°C while continuously introducing an aqueous feed of 40 percent by weight of dextrose which was fed in at a rate of about 20 ml./hr., and a mixture of o-, m-, and p-diethylbenzenes was fed in at a rate of about 6 ml./hr. This maintains the diethylbenzene concentration in the fermentation broth in the range of from 10 to 100 p.p.m. The pH varies during the run but is generally within the range of 6.5 to 7.0. The run is continued for 42 hours, at which time it is harvested by extraction with ethyl ether. The ether is evaporated to give approximately 50 gms of product, which is analyzed by IR, UV, gas chromatography and NMR to be (by weight):

| | |
|---|---|
| m-diacetylbenzene | 13 percent |
| p-diacetylbenzene | 6 percent |
| 3-(1-hydroxyethyl)acetophenone | 41 percent |
| 4-(1-hydroxyethyl)acetophenone | 38 percent |

It will be noted, incidentally, from the foregoing that while the meta- and para-isomers are oxidized by the micro-organism, the ortho-isomer remains essentially untouched and thus is not oxidized.

EXAMPLE 2

In accordance with the foregoing procedure, but substituting m-di-n-propylcyclohexane for a mixture of diethylbenzenes, and *Nocardia salmonicolor* for *Nocardia corallina*, there is obtained a mixture of 1,3-diacetonylcyclohexane and 1-acetonyl, 3-(2-hydroxy-1-propyl)cyclohexane.

EXAMPLE 3

In accordance with the procedure of Example 1, but substituting 1,3,5-triethylbenzene for the diethylbenzenes, and *Nocardia minima* for *Nocardia corallina*, there is obtained a mixture of 1,3,5-triacetylbenzene and 1,3-diacetyl-5(1-hydroxyethyl) benzene.

We claim:

1. A process for the oxidation of the $\beta$-carbon atom of a two to three carbon alkyl side chain of a cyclic organic compound selected from the group consisting of a mononuclear aromatic compound or a cycloaliphatic compound, wherein said cyclic organic compound contains from two to three such alkyl side chains, and wherein the cycloaliphatic ring contains from five to eight carbon atoms, which comprises subjecting said cyclic organic compound to the action of a $\beta$-carbon oxidizing strain of Nocardia selected from the group consisting of *Nocardia corallina* ATCC 19,070, *Nocardia nov.sp.* ATCC 19,071, *Nocardia corallina* ATCC 19,148, *Nocardia salmonicolor* ATCC 19,149, and *Nocardia minima* ATCC 19,150, in the presence of a nutrient medium and under fermentation conditions, and recovering the corresponding oxidized products.

2. The process according to claim 1 wherein the cyclic organic compound is a mixture of o-, m- and p-diethylbenzene and a mixture of m-diacetylbenzene, p-diacetylbenzene, 3-(1-hydroxyethyl)acetophenone, and 4-(1-hydroxyethyl)-acetophenone is recovered.

3. The process according to claim 2 wherein the microorganism is *Nocardia corallina* ATCC 19,070.

4. The process according to claim 1 wherein the cyclic organic compound is m-di-n-propylcyclohexane, and a mixture of 1,3-diacetonylcyclohexane and 1-acetonyl, 3-(2-hydroxy-1-propyl)cyclohexane is recovered.

5. The process according to claim 4 wherein the microorganism is *Nocardia salmonicolor* ATCC 19,149.

6. The process according to claim 1 wherein the cyclic organic compound is 1,3,5-triethylbenzene, and a mixture of 1,3,5-triacetylbenzene and 1,3-diacetyl-5-(1-hydroxy-ethyl)benzene is recovered.

7. The process according to claim 6 wherein the microorganism is *Nocardia minima* ATCC 19,150.

* * * * *